United States Patent [19]

Medbery

[11] Patent Number: 4,528,021
[45] Date of Patent: Jul. 9, 1985

[54] GRANULATED FERTILIZER AND SLURRY PROCESS THEREFOR

[75] Inventor: John L. Medbery, Doraville, Ga.

[73] Assignee: International Minerals & Chemical Corp., Terre Haute, Ind.

[21] Appl. No.: 561,763

[22] Filed: Dec. 15, 1983

[51] Int. Cl.³ .............................................. C05B 1/02
[52] U.S. Cl. .......................................... 71/41; 71/44; 423/319
[58] Field of Search .................. 71/33, 34, 41, 43, 44; 423/167, 309, 319, 320

[56] References Cited

U.S. PATENT DOCUMENTS

| 2,598,658 | 5/1952 | Procter et al. | 71/37 |
| 2,937,937 | 5/1960 | Dunbar | 71/41 |
| 3,431,096 | 3/1969 | Hill et al. | 71/41 |
| 3,868,243 | 2/1975 | MacDonald | 71/41 |

FOREIGN PATENT DOCUMENTS 715556  2/1980  U.S.S.R. ................................. 71/41

OTHER PUBLICATIONS

Yarnell, J. J.: "No Longer Mud Chemistry", Phosphorus & Potassium, No. 80, Nov./Dec. 1975, The British Sulphur Corp. Ltd.

Primary Examiner—Ferris H. Lander
Attorney, Agent, or Firm—Robert H. Dewey

[57] ABSTRACT

A continuous process for the production of a granulated fertilizer wherein comminuted phosphate rock, phosphoric acid and water are introduced into a pre-reactor where they are heated. The mixture is continuously withdrawn and transferred to a digester where heating is continued resulting in formation of a slurry. The slurry is continuously withdrawn and is split into two streams, one of which is recycled to either the pre-reactor or to the digester while the other stream is delivered to a granulator where it is mixed with other fertilizer ingredients and dried to form the granulated fertilizer.

13 Claims, No Drawings

GRANULATED FERTILIZER AND SLURRY PROCESS THEREFOR

BACKGROUND OF THE INVENTION

This invention relates to granulated fertilizer. In a particular aspect, this invention relates to a granulated fertilizer consisting of phosphate and potassium which is agglomerated by use of a slurry.

The manufacture of triple superphosphate by the slurry process is well-known. It has been described in several references. According to J. J. Yarnell, "Phosphorous and Potassium", No. 80, November/December, 1975, published by the British Sulphur Corporation Limited, phosphate rock and phosphoric acid are mixed together in the first of two continuously stirred reactor tanks. The first tank then overflows to the second tank, which is usually larger. As the reaction progresses a slurry is formed, which is then pumped to a granulator where it is sprayed on a rolling bed of recycle material which is partially wetted by the slurry. Soon thereafter, the slurry begins to undergo a phase change from fluid to gelatinous which bonds the recycle particles together into agglomerates. From the granulator, the material is discharged to a dryer where the moisture is removed until only about 2.5% water remains. After screening, oversize is crushed and recycled with undersize to the granulator. The product portion is cooled and then sent to storage.

It has been customary to use high quality phosphate rock of about 72% BPL (Bone Phosphate of Lime, i.e. tricalcium phosphate equivalent) in making triple superphosphate. This is necessary as the desired grade for marketing is 46% available $P_2O_5$, and when lower grade rocks are used this guarantee cannot be met. Also, most producers of granular triple superphosphate who use a slurry process, require a finely ground rock, typically 99% minus 60 mesh, 94–96% minus 100 mesh, and 81–83% minus 200 mesh.

Granulation of nitrogen-containing fertilizers (X-X-X grade) is also known. In this process, liquid phase required for agglomeration is obtained by using ammonia or ammoniating solutions to react chemically with phosphate materials or sulfuric acid. The salts thus generated in the hot, wet medium are themselves part of the liquid phase in the ammoniator-granulator equipment.

The ammoniation and neutralization reactions are exothermic, and as the temperature increases, so does the solubility of the entire process mass. Water and steam are also used to optimize the tendency of these liquid-solid combinations to adhere to each other and form agglomerates. However, in O-X-X grades there is no nitrogen, and consequently, the heats of reaction of ammonia with other chemicals are not available to provide liquid phase. Likewise, the highly soluble salts, ammonium-nitrate or urea, cannot be used either. In the O-X-X formulations, only water and steam are available as agglomerating agents.

The production of steam and evaporation of water requires energy. At today's escalating fuel costs, these are not attractive choices as agglomerating agents. Also, water or steam granulation is inefficient in achieving agglomeration, and produces a soft, easily broken particle when dried. There is, therefore, a need for an improved process for producing granulated fertilizer.

SUMMARY OF THE INVENTION

It is an object of this invention to provide an improved process for the production of granulated fertilizers.

It is another object of this invention to provide a granulated fertilizer having improved physical properties.

It is yet another object of this invention to provide a process which requires minimal water for formation of slurry, minimal steam for heating the slurry and minimal fuel for drying the granules.

Still yet other objects will be apparent to those skilled in the art from the disclosure herein.

The above objects are provided by a continuous slurry process for the production of granulated fertilizers comprising the steps of (a) continuously introducing into a pre-reactor comminuted phosphate rock, phosphoric acid in an amount sufficient to provide a ratio of $P_2O_5$ to CaO of 0.7 to 1.0 and water in an amount sufficient to dilute the phosphoric acid to not less than 38%, (b) heating the mixture with continuous agitation, while (c) continuously transferring the mixture to a digester, (d) heating the mixture in the digester with agitation for a length of time sufficient to form a slurry, while, (e) continuously withdrawing slurry as an overflow stream, (f) splitting the withdrawn slurry stream into two streams, (g) recycling one stream to the pre-reactor or to the digester, (h) delivering the other stream to a granulator and mixing with other dry fertilizer ingredients, thereby producing fertilizer granules, and (i) drying the granules.

The resulting fertilizer has improved properties, makes use of less expensive materials and requires less energy for production than comparable phosphate and potassium fertilizers made by other granulation methods. The slurry which is used as an agglomeration agent is a triple superphosphate in the fluid phase.

DETAILED DISCUSSION

According to the practice of this invention, phosphate rock is comminuted to a size such that 90% passes a 100-mesh screen and 70–80% passes a 200-mesh screen. Any convenient source of phosphate rock may be used, generally of from about 66–72% BPL, but because the process works very well with lower quality rock, 66–68% acidulation grade rock may be the rock of choice. An important aspect of this invention is the convenience of using rock of any grade or grind that may be on hand at the plant site for the purpose of making single superphosphate.

The comminuted rock is delivered to a pre-reactor on a continuous basis using suitable equipment, e.g. a weigh belt feeder, to monitor the amount, as is known. Phosphoric acid is continuously added to the pre-reactor in an amount to provide a mole ratio of $P_2O_5$ to CaO within the range of about 0.7–1.00, preferably about 0.85 (equivalent to 1.78–2.54 by weight, preferably about 2.16). The phosphoric acid may be of from about 38–54% $P_2O_5$. The concentration in the pre-reactor should be within the range of 38–44% $P_2O_5$, preferably 38–42%, and if necessary sufficient water to dilute the more concentrated acid is added. Carbon dioxide from calcium carbonate in the rock, if any, is emitted during the reaction along with some silicon tetrafluoride. These gases may cause foaming, so a suitable anti-foam agent, many of which are known, is also added, usually with whatever water is introduced. Also added at this time as a spray to wet the in-coming ground rock (except when first starting up the process, or in shutting down the process) is recycled slurry from the digester, as will be described in detail below.

The contents of the pre-reactor are continuously agitated and heat is provided, e.g. by steam injection, to maintain a temperature of about 175°–220° F., preferably about 200° F. During the continuous introduction of reactants, the overflow exits from the pre-reactor into the digester where agitation is continued and the temperature is raised to and is maintained within the range of 200°–225° F., preferably about 215° F. Silicon tetrafluoride released by the reaction, and additional carbon dioxide, if any, is vented to a scrubber.

The rates at which the ingredients are fed into the reactor are selected to provide a residence time in the digester of from 60–120 minutes, preferably about 90 minutes. Similarly, the size of the digester is selected to provide a desired production rate. The residence time in the digester will vary according to the reaction rate, which, in turn, is dependent upon the reactivity of the rock, the grind of the rock, and the temperature.

As the reaction progresses, the reacting slurry mixture progresses from a highly fluid state to a plastic state and finally to a solid state. The residence time is selected so that the slurry exits from the digester as a fluid but in the granulator it progresses through the plastic state nearly to the solid state before it exits to the dryer.

The specific gravity of the slurry is a convenient way to monitor the process, and should be within the range of 1.70 to 1.84 with about 1.77 preferred. This ensures that the rate of feed of liquids (phosphoric acid and water) are proportioned properly to the feed rate of the rock. It is also necessary to sample the slurry periodically for a laboratory determination of the mol ratio of $P_2O_5$ to $CaO$ and for free phosphoric acid. This will ensure that the acid to rock ratio is maintained and that the desired completeness of the reaction is being achieved.

Agitation can be conveniently provided by a propeller-type mixer which directs the slurry downwardly in a central vortex from which it rises along the sides of the digester. An overflow outlet is provided near the top of the liquid level but separated from the main body of the slurry by a dam extending from above the liquid surface to near the bottom of the digester. Slurry rising inside the dam is discharged from the overflow outlet to a splitter which divides the discharged stream into two portions, which preferably may be of approximately equal volume or may be divided into proportions of 90–10, or more likely, 60–40. One of the streams (the smaller if they are not equal) is directed to the granulator. The other (i.e. the larger if these are not equal) is recycled to the pre-reactor where it is sprayed onto the incoming ingredients, especially the ground rock, because the latter tends to float on the top of the liquid and resists wetting due to the fine particle size.

However, during a shut-down of the process, the feed of rock, acid and water is shut down and the contents of the pre-reactor are delivered to the digester. A means is provided also to deliver recycle slurry to the digester at this time until the system is cleared. Both the pre-reactor and digester are equipped with drains, lines and pumps so that substantially all slurry can be emptied and the equipment can be cleaned by washing.

The stream of slurry that exits to the granulator, which is of conventional design, is mixed with dry fertilizer ingredients, including recycled oversized and undersized product within the granulator. The mixture is then granulated as is known and the product is then transferred to a conventional dryer. After drying, the product is screened to a pre-selected mesh size or distribution. Oversized is crushed, combinated with undersized and recycled to the granulator. Product of acceptable size is cooled and sent to storage. The product is composed of smooth, hard, spherical-shaped pellets of superior properties.

Any desired dry fertilizer materials may be mixed with the slurry to achieve granulation, as mentioned above. Such materials are known and can include, especially, a potassium source such as the sulfate, the chloride, etc. and trace elements. Phosphate materials can also be used, as necessary to maintain a proper fluid to dry ratio for granulation and to make the $P_2O_5$ guarantee of the grade. A convenient method of mixing with the slurry is to spray the slurry onto the dry ingredients in the granulator.

The invention will be better understood with reference to the following examples. It is understood, however, that the examples are intended only to illustrate the invention and it is not intended that the invention be limited thereby.

EXAMPLE 1

The object of this experiment was to produce a fertilizer product having an analysis of 0-15-30.

Phosphate rock analyzing 68% bone phosphate of lime (tricalcium phosphate) was comminuted to a fineness such that 90% passed a 100-mesh screen. It was delivered to a pre-reactor having dimensions of 3'×6' at a rate of 200 lbs per ton of product using a weigh belt. Simultaneously water at a rate of 76 lb/ton and phosphoric acid (51.4% $P_2O_5$) at a rate of 266 lb/ton were also delivered to the prereactor. The phosphoric acid feed was selected to provide a total $P_2O_5$:CaO ratio of 2.16 by weight (equivalent to a mole ratio of 0.85). The amount of water was selected to dilute the phosphoric acid to 40.0%. Anti-foam agent 0.08 lb/ton (Defoamer 2617-M made by Southern Sizing Corporation was used; it is described as an anionic fatty emulsion), was also delivered to the pre-reactor. The mixture was heated with agitation to a temperature of 175°–210° F. by steam injection. Silicon tetrafluoride and carbon dioxide vapors released by the reactants were vented to a scrubber. The rate of feed of ingredients to the pre-reactor and the size of the digester were selected to provide a retention time of 90 minutes for a production rate of 20 tons/hour.

When the volume of reactants in the pre-reactor reached a predetermined level, the mixture overflowed to a digester unit where it was heated with agitation to 215°–225° F., thereby forming a slurry. Silicon tetrafluoride vapor released by the reactants was vented to a scrubber. The digester unit which was of 7'×10' dimension, was provided with an overflow outlet which was separated from the main body of the slurry by a dam which extended from above the liquid level nearly to the bottom. The agitator was of the propeller type which created a vortex, thus sending the slurry to the bottom at the center of the digester from which it rose to the surface along the sides. However, a portion of the rising slurry was trapped by the dam and exited to a splitter where it was divided into two streams of approximately equal volume. One stream was recycled to the pre-reactor where it was sprayed onto the entering phosphate rock and the other stream was delivered to a conventional rotary drum granulator where it was sprayed onto a mixture of dry fertilizer materials consisting of run of pile triple superphosphate, normal superphosphate and standard potassium chloride in amounts sufficient to provide 36 lb/ton, 548 lb/ton and 1025 lb/ton of these materials respectively. From the granulator, the product was delivered to a conventional dryer operated at 900° F. The dried granules were round, hard and smooth. They were screened to select the size intended for use as the product.

When all of the phosphate rock, water and phosphoric acid needed for the production run had been delivered to the pre-reactor, the process was shut down by stopping the feed of ingredients, diverting the recycle stream to the digester and emptying the pre-reactor. After 90 minutes retention time in the digester, the slurry was emptied from it, the recycle stream was turned off and all product was granulated and dried.

The production rate was 20 tons/hour. There was lost by evaporation 151 lb/ton of moisture from the product. The data are given in Table 1.

TABLE 1

| Conc. of Acid, % $P_2O_5$ | 51.4 | |
|---|---|---|
| Diluted to, % $P_2O_5$ | 40.0 | |
| Digester Feed, lb/ton of Product | | |
| Phosphate Rock | 200 | |
| Phosphoric Acid | 266 | |
| Water | 76 | |
| Anti-foam | 0.08 | |
| Granulator Feed, lb/ton of Product | | |
| Triple superphosphate* | 36 | |
| Normal superphosphate | 548 | |
| Potassium chloride | 1025 | |
| Product Analysis | | |
| Shift No. | 1 | 2 |
| Moisture, % | 1.7 | 2.0 |
| Total $P_2O_5$, % | 15.94 | 16.78 |
| Available $P_2O_5$, % | 15.49 | 14.93 |
| $K_2O$, % | 31.3 | 29.2 |
| $H_3PO_4$, % (free acid) | 2.55 | 4.02 |

*Run of Pile

EXAMPLES 2-5

The experiment of Example 1 was repeated in all essential details except that the ingredients were selected to provide a variety of formulas. The essential information is given in Tables 2 and 3. In every case, the potassium chloride and langbeinite used was the standard crystal size. The langbeinite used was SUL-PO-MAG ® brand, marketed by International Minerals & Chemical Corporation. The concentration of acid used throughout was 50.2% $P_2O_5$ and the ratio $P_2O_5/CaO$ was 2.16 by weight. The rock phosphate was 68% BPL and 0.08 lb/ton of product of anti-foam agent was added.

TABLE 2

| Example No. | 2 | 3 | 4 |
|---|---|---|---|
| Product Formula | 0-20-20 | 0-10-30 | 0-15-30 |
| Acid Diluted to, % $P_2O_5$ | 40 | 42.6 | 42.0 |
| Digester Feed, lb/ton of Product | | | |
| Rock | 200 | 160 | 200 |
| $H_3PO_4$ | 279 | 223 | 279 |
| Water | 71 | 40 | 54 |
| Granulator Feed, lb/ton of Product | | | |
| Triple superphosphate* | 176 | — | 26 |
| Single superphosphate | 729 | 260 | 548 |
| KCl | 683 | 890 | 1025 |
| Langbeinite | — | 367 | — |
| Minor element mix | — | 55 | — |

TABLE 2-continued

| Sand | — | 125 | — |
|---|---|---|---|
| Loss by Evaporation, lb | 138 | 65 | 132 |
| Shift No. | 1 2 | 1 | 1 |
| Production Rate, ton/hour | 20-25  25 | 20 | 25 |
| Product Analysis, % | | | |
| Moisture | 3.2   3.0 | 2.1 | 1.5 |
| Total $P_2O_5$ | 20.9  21.1 | 11.1 | 14.7 |
| Available $P_2O_5$ | 20.2  20.9 | 11.0 | 14.5 |
| $K_2O$ | 20.6  20.5 | 29.4 | 31.4 |
| Mg | —    — | 2.2 | — |
| $H_3PO_4$ (free acid) | 3.52  3.08 | 1.84 | 3.52 |

*Run of Pile

TABLE 3

| Example No. | 5 | | |
|---|---|---|---|
| Product Formula | 0-20-20 | | |
| Shift No. | 1 | 2 | 3 |
| Production Rate, ton/hour | 20 | 25 | 25 |
| Acid Dilute to, % $P_2O_5$ | 42.0 | 42.6 | 42.6 |
| Digester Feed, lb/ton of Product | | | |
| Rock | 200 | 160 | 160 |
| $H_3PO_4$, 50.2% | 279 | 223 | 223 |
| Water | 54 | 40 | 40 |
| Granulator Feed, lb/ton of Product | | | |
| Triple superphosphate* | 385 | 460 | 460 |
| Single superphosphate | 220 | 255 | 255 |
| KCl | 549 | 549 | 549 |
| Langbeinite | 367 | 367 | 367 |
| Minor element mix | 54 | 54 | 54 |
| Loss by evaporation | 108 | 108 | 108 |
| Product Analysis, % | | | |
| Moisture | 2.45 | 2.0 | 1.8 |
| Total $P_2O_5$ | 19.5 | 20.4 | 21.1 |
| Available $P_2O_5$ | 18.9 | 19.7 | 20.8 |
| $K_2O$ | 21.3 | 20.8 | 20.4 |
| Mg | 2.25 | 2.24 | 2.0 |
| $H_3PO_4$ (free acid) | 3.20 | 3.44 | 3.68 |

*Run of Pile

I claim:

1. A continuous slurry process for the production of granulated fertilizers comprising the steps of
   (a) continuously introducing into a pre-reactor (i) phosphate rock containing 66-75% tricalcium phosphate comminuted to a size such that 90% passes a 100-mesh screen and 70-80% passes a 200-mesh screen, (ii) phosphoric acid containing 38-54% $P_2O_5$ in an amount sufficient to provide a ratio of $P_2O_5$ to CaO in the reaction mixture of 0.7 to 1.0, and (iii) water in an amount sufficient to dilute the phosphoric acid to 38-44% $P_2O_5$,
   (b) heating the mixture with agitation to 175°-220° F., and
   (c) continuously transferring the mixture to a digester having a volume sufficient to provide a retention of 60 to 90 minutes,
   (d) heating the mixture with agitation to a temperature of 200°-225° F. for a retention time of 60 to 90 minutes, thereby forming a slurry while
   (e) continuously withdrawing slurry
   (f) splitting the slurry into two streams
   (g) recycling one stream to the pre-reactor, and
   (h) delivering the other stream to a granulator and mixing with other dry fertilizer ingredients, thereby producing fertilizer granules, and
   (i) drying the granules.

2. The process of claim 1 wherein the phosphate rock contains 66-68% BPL comminuted to a size such that 90% passes a 100 mesh screen.

3. The process of claim 1 wherein the ratio of $P_2O_5$ to CaO is about 2.16 by weight.

4. The process of claim 1 wherein the concentration of acid in the pre-reactor is about 38–42%.

5. The process of claim 1 wherein the temperature in the pre-reactor is about 200° F.

6. The process of claim 1 wherein the temperature of the digester is maintained at about 215° F.

7. The process of claim 1 wherein the residence time in the reactor is about 90 minutes.

8. The process of claim 1 wherein the specific gravity of the slurry in the digester is from 1.70 to 1.84.

9. The process of claim 8 wherein the specific gravity of the slurry is about 1.77.

10. The process of claim 1 wherein the outlet stream from the digester is split into two streams, one of which is from 10–50 parts by volume of the outlet stream, and the other of which is from 50–90 parts by volume of the outlet stream.

11. The process of claim 10 wherein the stream is split into two streams of 60–40 parts by volume.

12. The process of claim 11 wherein the stream is split into equal parts.

13. A granulated fertilizer produced by the process of claim 1.

* * * * *